Patented Apr. 8, 1947

2,418,784

UNITED STATES PATENT OFFICE 2,418,784

PROCESS OF ACID REFINING VISCOUS HYDROCARBON OIL

Darwin M. McCormick, Springfield, Carroll B. Barbour, Yeadon, and William K. Griesinger, Drexel Hill, Pa., assignors to The Atlantic Refining Company, Philadelphia, Pa., a corporation of Pennsylvania No Drawing. Application August 6, 1943, Serial No. 497,642

16 Claims. (Cl. 196—40)

The present invention relates to the refining of viscous hydrocarbon oils, and relates more particularly to improvements in the technique of acid treating lubricating oil stocks, whereby economies in acid consumption and recovery are effected, higher yields of treated oil are realized, and the difficulties involved in handling and disposal of acid sludge are obviated.

In the refining of lubricating oil stocks by treatment with sulfuric acid there is formed a sludge comprising tarry reaction products and diluted sulfuric acid. The bulk of this sludge separates fairly readily from the treated oil, and depending upon the nature of the oil and the conditions of acid treatment, the sludge may be either hard, coky and difficult or impossible to pump, or on the other hand may be soft and readily handled. However, in most cases, there remains in suspension in the oil a relatively small amount of finely-divided sludge or "pepper" which will not settle within a reasonable period of time. In order to effect removal of this residual sludge or "pepper," it has been conventional practice to subject the treated oil to spray washing with water, whereby the suspended sludge particles are coagulated and caused to settle from the oil. Alternatively, a practice more recently employed comprises applying a spray wash to the oil-acid sludge mixture prior to the settling and separation of any sludge from the oil. However, spray washing or water coagulation is disadvantageous in this case since the coagulated sludge is hard, coky and difficult to handle, and does not blend well with other refinery sludges, the disposal of which has always been a troublesome refinery problem. Furthermore, the sulfuric acid which may be recovered from the sludge is undesirably diluted, thus increasing the cost of subsequent concentration to useful strength.

We have found that the above difficulties may be overcome and that relatively soft, pumpable sludges may be obtained by dispensing with spray washing or water coagulation, and substituting therefor an improvement comprising the addition of a small amount of a surface tension reducing agent to the oil-acid sludge mixture prior to the settling and separation of the acid sludge. The surface tension reducing agent is preferably applied in the form of a dilute aqueous solution containing a concentration of from 1% to 5% of said agent. Among the surface tension reducing agents which may be satisfactorily employed in accordance with our invention are the alkali metal salts or soaps of the aliphatic carboxylic acids such as oleic acid, stearic acid, and palmitic acid, or mixtures thereof, as well as acids produced by the oxidation of petroleum fractions or paraffin wax; alkali metal salts or soaps of more complex carboxylic acids such as abietic acid, rosin acids, rosin oil acids, or acids from hydrogenated, sulfonated, or polymerized rosin; alkali metal salts or soaps of the lower molecular weight, water-soluble petroleum naphthenic or sulfonic acids, water-soluble sulfonated fatty acids, sulfonated aromatic hydrocarbons or sulfonated phenols; and sulfonated or sulfated aliphatic alcohols.

In accordance with our invention only very minor quantities of a surface tension reducing agent, as exemplified above, are required to effect the desired result, i. e., the coagulation of the acid sludge and the settling of the sludge from the oil in the form of a soft or fluid, readily pumpable mixture of a tarry material and spent acid. Quantities of the order of 7 to 35 lbs. of agent per 1000 bbl. of oil (0.0025% to 0.0125% dry basis), applied in the form of a dilute aqueous solution or suspension, have been found highly satisfactory. For example, 0.1% to 0.5% by volume based on the oil of a 2% concentration of surface tension reducing agent in water is usually sufficient to accomplish the desired coagulation and settling of acid sludge in a soft, pumpable form. Less than about 0.1% by volume of such solution does not produce efficient coagulation, and more than about 0.5% by volume is without substantial benefit, although somewhat larger quantities may be used without detriment. In general, about 2 bbls. of a 2% aqueous solution of the agent per 1000 bbls. of oil is sufficient to produce satisfactory settling of the acid sludge.

In carrying out our process, a viscous hydrocarbon oil such as the lubricating oil stock is subjected to sulfuric acid treatment, the acid being applied in one or more dumps according to conventional practice. Upon completion of the contacting of the oil with a sulfuric acid, and prior to the removal of the acid sludge, we add to the mixture of oil and sludge, a small quantity of a surface tension reducing agent preferably in aqueous solution. The resulting mixture of oil, acid sludge, and agent are then agitated by suitable means, for example, by air blowing for a short period of time, and the mixture is then permitted to settle and stratify, the oil forming the upper layer and the acid sludge the lower layer. The oil layer is separated from the sludge layer by decantation, and the oil is finished by conventional treatment with neutralizing agents and/or decolorizing adsorbents. The sludge, in a soft or fluid condition is pumpable without difficulty, and is readily disposed of, per se, or in admixture with other refinery sludges.

Our invention may be further illustrated by the examples shown in the following tables, which, however, are not to be construed as limiting the scope thereof. The two oil stocks utilized, known as "102 paraffin oil" and "300 paraffin oil," were obtained by the fractional distillation It will be seen from the examples given above, that by our process there may be obtained, in general, higher yields of finished lubricating oils of superior properties than are obtained by conventional treating methods involving the water settling of acid sludge. Furthermore, the acid sludges produced in our process are soft, of uniform consistency, and readily pumpable, as contrasted with the hard, coky, unpumpable sludges resulting from water settling.

While we have described our process particularly with reference to the treatment of lubricating oil stocks such as paraffin oils or distillates, such process is also applicable in the refining of insulating oil stocks, turbine oils, technical and medicinal white oils, or in fact any oils which normally yield hard, unpumpable sludges upon acid treatment. When the acid refining is effected with the application of a single dump of acid, we apply the surface tension reducing agent during the latter part of the acid contacting step or at the completion thereof, and prior to the settling and removal of the acid sludge. On the other hand, when the acid refining involves the application of acid in a plurality or series of dumps, we add the surface tension reducing agent preferably upon the completion of the last acid contacting step and prior to the settling of the sludge, since spray washing with water is not normally resorted to until after the last dump of acid has been used and therefore little difficulty is encountered with the sludge up to the point where spray washing would normally be applied. In certain cases, however, it is advantageous to add the surface tension reducing agent after each dump of acid, particularly in the refining of medicinal white oils with fuming sulfuric acid wherein the sludges from the first several acid dumps are usually hard, coky, and difficult to handle.

We claim:

1. The process of acid refining viscous hydrocarbon oil with the production of acid sludge characterized by its ready pumpability, which comprises contacting said oil with sulfuric acid in the presence of an added small amount of a surface tension reducing agent sufficient to render the sludge readily pumpable, settling the resultant acid sludge, and separating the settled sludge from the oil.

2. The process of acid refining viscous hydrocarbon oil with the production of acid sludge characterized by its ready pumpability, which comprises contacting said oil with sulfuric acid in the presence of an added small amount of an alkali metal salt of an aliphatic carboxylic acid having surface tension reducing properties, said amount being sufficient to render the sludge readily pumpable settling the resultant acid sludge, and separating the settled sludge from the oil.

3. The process of said acid refining viscous hydrocarbon oil with the production of acid slduge characterized by its ready pumpability, which comprises contacting said oil with sulfuric acid in the presence of an added small amount of a sodium salt of a higher fatty acid sufficient to render the sludge readily pumpable, settling the resultant acid sludge, and separating the settled sludge from the oil.

4. The process of acid refining viscous hydrocarbon oil with the production of acid sludge characterized by its ready pumpability, which comprises contacting said oil with sulfuric acid in the presence of 0.0025% to 0.0125% of a sodium salt of a higher fatty acid, settling the resultant acid sludge, and separating the settled sludge from the oil.

5. The process of acid refining viscous hydrocarbon oil with the production of acid sludge characterized by its ready pumpability, which comprises contacting said oil with sulfuric acid, adding to the resultant mixture of oil and acid sludge a small amount of a surface tension reducing agent sufficient to render the sludge readily pumpable, agitating the mixture and thereafter settling the acid sludge, and separating the settled sludge from the oil.

6. The process of acid refining viscous hydrocarbon oil with the production of acid sludge characterized by its ready pumpability, which comprises contacting said oil with sulfuric acid, adding to the resultant mixture of oil and acid sludge a small amount of an alkali metal salt of an aliphatic carboxylic acid having surface tension reducing properties, said amount being sufficient to render the sludge readily pumpable, agitating the mixture and thereafter settling the acid sludge, and separating the settled sludge from the oil.

7. The process of acid refining viscous hydrocarbon oil with the production of acid sludge characterized by its ready pumpability, which comprises contacting said oil with sulfuric acid, adding to the resultant mixture of oil and acid sludge a small amount of a sodium salt of a higher fatty acid sufficient to render the sludge readily pumpable, agitating the mixture and thereafter settling the acid sludge, and separating the settled sludge from the oil.

8. The process of acid refining viscous hydrocarbon oil with the production of acid sludge characterized by its ready pumpability, which comprises contacting said oil with sulfuric acid, adding to the resultant mixture of oil and acid sludge from 0.0025% to 0.0125% of a sodium salt of a higher fatty acid, agitating the mixture and thereafter settling the acid sludge, and separating the settled sludge from the oil.

9. The process of acid refining viscous hydrocarbon oil with the production of acid sludge characterized by its ready pumpability, which comprises contacting said oil with concentrated sulfuric acid, adding to the resultant mixture of oil and acid sludge a small amount of an aqueous solution of a surface tension reducing agent sufficient to render the sludge readily pumpable, agitating the mixture and thereafter settling the acid sludge, and separating the settled sludge from the oil.

10. The process of acid refining viscous hydrocarbon oil with the production of acid sludge characterized by its ready pumpability, which comprises contacting said oil with concentrated sulfuric acid, adding to the resultant mixture of oil and acid sludge a small amount of an aqueous solution of an alkali metal salt of an aliphatic carboxylic acid having surface tension reducing properties, said amount being sufficient to render the sludge readily pumpable, agitating the mixture and thereafter settling the acid sludge, and separating the settled sludge from the oil.

11. The process of acid refining viscous hydrocarbon oil with the production of acid sludge characterized by its ready pumpability, which comprises contacting said oil with concentrated sulfuric acid, adding to the resultant mixture of oil and acid sludge a small amount of an aqueous solution of a sodium salt of a higher fatty acid sufficient to render the sludge readily pumpable, agitating the mixture and thereafter settling the acid sludge, and separating the settled sludge from the oil.

12. The process of acid refining viscous hydrocarbon oil with the production of acid sludge characterized by its ready pumpability, which comprises contacting said oil with concentrated sulfuric acid, adding to the resultant mixture of oil and acid sludge from 0.0025% to 0.0125% of a sodium salt of a higher fatty acid in aqueous solution, agitating the mixture and thereafter settling the acid sludge, and separating the settled sludge from the oil.

13. The process of acid refining viscous hydrocarbon oil with the production of acid sludge characterized by its ready pumpability, which comprises contacting said oil with concentrated sulfuric acid, adding to the resultant mixture of oil and acid sludge from 0.1% to 0.5% by volume of a 2% aqueous solution of a sodium salt of a higher fatty acid, agitating the mixture and thereafter settling the acid sludge, and separating the settled sludge from the oil.

14. The process of acid refining viscous hydrocarbon oil with the production of acid sludge characterized by its ready pumpability, which comprises contacting said oil with concentrated sulfuric acid, adding to the resultant mixture of oil and acid sludge a small amount of an aqueous solution of a sodium salt of a rosin acid sufficient to render the sludge readily pumpable, agitating the mixture and thereafter settling the acid sludge, and separating the settled sludge from the oil.

15. In a process of refining viscous hydrocarbon oil with the production of acid sludge characterized by its ready pumpability, the step which comprises commingling with a mixture of oil and sulfuric acid sludge, a small amount of a surface tension reducing agent sufficient to render the sludge readily pumpable prior to settling said sludge from said oil.

16. In a process of refining viscous hydrocarbon oil with the production of acid sludge characterized by its ready pumpability, the step which comprises commingling with a mixture of oil and sulfuric acid sludge, a small amount of a sodium salt of a higher fatty acid sufficient to render the sludge readily pumpable prior to settling said sludge from said oil.

DARWIN M. McCORMICK.
CARROLL B. BARBOUR.
WILLIAM K. GRIESINGER.

REFERENCES CITED

The following references are of record in the file of this patent:

UNITED STATES PATENTS

| Number | Name | Date |
|---|---|---|
| 2,286,343 | Chechot | June 16, 1942 |
| 2,293,253 | Galindo | Aug. 18, 1942 |
| 1,950,739 | Morrell | Mar. 13, 1934 |

FOREIGN PATENTS

| Number | Country | Date |
|---|---|---|
| 581,469 | French | Sept. 29, 1924 |
| 628,008 | French | June 20, 1927 |